United States Patent
Lee et al.

(10) Patent No.: US 6,634,860 B2
(45) Date of Patent: Oct. 21, 2003

(54) FOIL FORMED STRUCTURE FOR TURBINE AIRFOIL TIP

(75) Inventors: Ching-Pang Lee, Cincinnati, OH (US); Melvin Robert Jackson, Niskayuna, NY (US); Stephen Joseph Ferrigno, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,107

(22) Filed: Dec. 20, 2001

(65) Prior Publication Data

US 2003/0118444 A1 Jun. 26, 2003

(51) Int. Cl.$^7$ .................................. F01D 5/18
(52) U.S. Cl. ................. 416/97 R; 416/241 R; 416/224
(58) Field of Search .............. 416/96 R, 96 A, 416/97 R, 90 R, 92, 224, 229 A, 241 R, 241 B; 415/173.1, 173.4, 173.5, 115, 116

(56) References Cited

U.S. PATENT DOCUMENTS

| | | | | |
|---|---|---|---|---|
| 3,873,347 A | * | 3/1975 | Walker et al. ............ 427/250 |
| 3,899,267 A | | 8/1975 | Dennis et al. | |
| 3,918,139 A | * | 11/1975 | Felten .................. 428/655 |
| 3,976,436 A | * | 8/1976 | Chang .................. 428/678 |
| 4,123,595 A | * | 10/1978 | Chang .................. 416/241 R |
| 4,142,824 A | | 3/1979 | Andersen | |
| 4,390,320 A | * | 6/1983 | Eiswerth ............... 416/97 R |
| 4,487,550 A | | 12/1984 | Horvath et al. | |
| 4,540,339 A | | 9/1985 | Horvath | |
| 5,348,446 A | | 9/1994 | Lee et al. | |
| 5,427,866 A | | 6/1995 | Nagaraj et al. | |
| 5,712,050 A | * | 1/1998 | Goldman et al. ........ 416/241 R |
| 5,733,102 A | * | 3/1998 | Lee et al. .............. 416/97 R |
| 6,092,983 A | | 7/2000 | Tomita et al. | |
| 6,164,914 A | * | 12/2000 | Correia et al. .......... 416/97 R |
| 6,224,337 B1 | * | 5/2001 | Lieland et al. .......... 416/97 R |
| 6,231,307 B1 | | 5/2001 | Correia | |
| 6,461,107 B1 | * | 10/2002 | Lee et al. .............. 416/96 R |
| 6,461,108 B1 | * | 10/2002 | Lee et al. .............. 416/96 R |

* cited by examiner

Primary Examiner—Christopher Verdier
(74) Attorney, Agent, or Firm—David L. Narciso; Pierce Atwood

(57) ABSTRACT

A turbine airfoil is provided having an integral tip cap and a pair of tip walls which extend radially outward past the tip cap to form a squealer tip. A coaxial pair of first and second holes extend through the tip cap and one of the tip walls respectively at an acute inclination angle, with the first hole being disposed so as to direct impingement cooling air on the tip wall having the second hole. A protective layer comprising a high temperature foil is disposed on the tip wall having the second hole therein.

14 Claims, 2 Drawing Sheets

FOIL FORMED STRUCTURE FOR TURBINE AIRFOIL TIP

BACKGROUND OF THE INVENTION

This invention relates generally to gas turbine engines and more particularly to gas turbine engine components formed in part from high temperature foil materials.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

Gas turbine engine hot section components, in particular the high pressure turbine section components, operate at extremely high temperatures and need to be cooled to have acceptable longevity. The tips of high pressure turbine (HPT) blades in particular are susceptible to high temperatures. The cooling is typically provided by extracting relatively cool air from an upstream location of the engine and routing the cooling air to components where it is needed. Conventionally the components to be cooled are hollow and have provisions for receiving and distributing the cooling air by various methods, for example the components may be film cooled by providing a plurality of passages which eject a blanket of cooling air over the surface of the component, or the components may be convectively cooled by causing the air to flow through various internal passages.

Conventional turbine blades often incorporate a squealer tip in which the sidewalls of the blade extend past the tip cap of the blade to define an open plenum therebetween. These extended tip walls are subject to severe oxidation and loss of material. There are two typical cooling designs for squealer tips. The first design uses impingement cooling from tip cap cooling holes. It is an effective cooling design. However, because of the angle required of the tip cap cooling holes, they cannot be formed in the completed airfoil and a braze-on tip cap having the cooling holes previously formed therein must be used. Unfortunately, a brazed joint has the drawback of increased susceptibility to oxidation compared to the base material of the blade. The second design is film cooling, which is used with blades having cast-in tip caps. Because the tip cap is cast-in, the tip cap cooling holes cannot be formed at the angle necessary to impingement cool the squealer tip. Therefore, film cooling on the outer surface of the pressure side wall is the main cooling source. However, the flow field near the tip region is quite complex and film cooling may not be fully satisfactory. It is further known to implement impingement cooling with a cast-in tip cap by forming a pair of coaxial angled holes through the squealer tip wall and the tip cap, and optionally, plugging the hole through the squealer tip wall. However, this still results in a blade having a tip constructed of a conventional superalloy, which is not as resistant to oxidation and material loss at high temperatures as desired.

Accordingly, there is a need for gas turbine engine airfoils having improved durability of the squealer tip walls.

BRIEF SUMMARY OF THE INVENTION

The above-mentioned need is met by the present invention, which provides a turbine airfoil having an integral tip cap and a pair of tip walls which extend radially outward past the tip cap to form a squealer tip. A coaxial pair of first and second holes extend through the tip cap and one of the tip walls respectively at an acute inclination angle, with the first hole being disposed so as to direct impingement cooling air on the tip wall having the second hole. A protective layer comprising a high temperature foil is disposed on the tip wall having the second hole therein.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
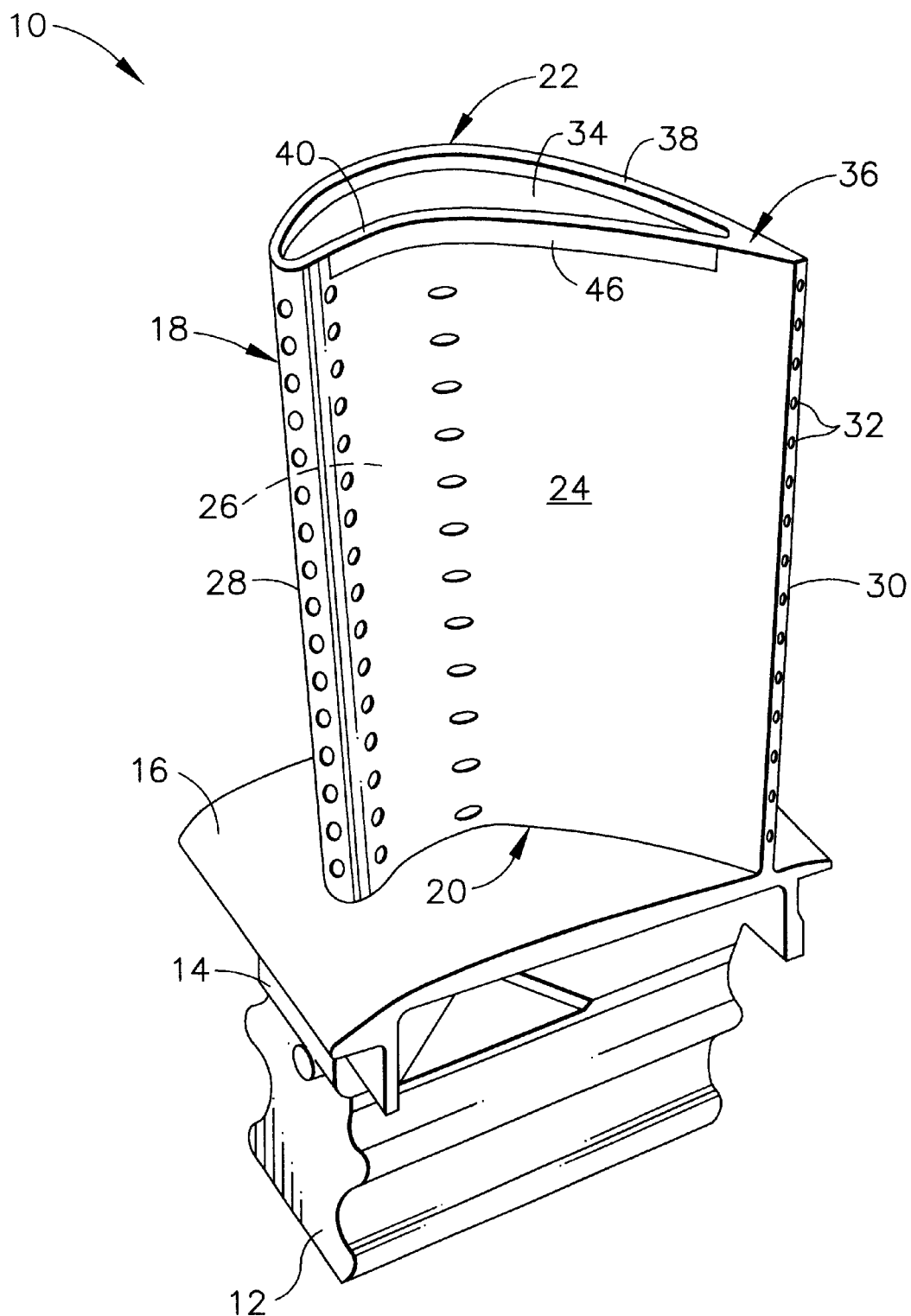
FIG. 1 is a perspective view of a high pressure turbine blade incorporating a foil-formed structure according to the present invention.

Referring to the drawings wherein identical reference numerals denote the same elements throughout the various views, FIG. 1 depicts an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 20 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 30. The airfoil 18 may take any configuration suitable for extracting energy from the hot gas stream and causing rotation of the rotor disk. The turbine blade 10 is preferably formed as a one-piece casting of a suitable superalloy, such as a nickel-based superalloy, which has acceptable strength at the elevated temperatures of operation in a gas turbine engine. The airfoil 18 may incorporate a plurality of trailing edge cooling holes 32, or it may incorporate a number of trailing edge bleed slots (not shown) on the pressure side wall 24 of the airfoil 18. The tip 22 of the airfoil 18 is closed off by a tip cap 34 which may be integral to the airfoil 18 or separately formed and attached to the airfoil 18. The present invention is especially advantageous when used with an integral tip cap 34, as explained below. An upstanding squealer tip 36 extends radially outwardly from the tip cap 34 and is disposed in close proximity to a stationary shroud (not shown) in the assembled engine, in order to minimize airflow losses past the tip 22.

Figure 2:
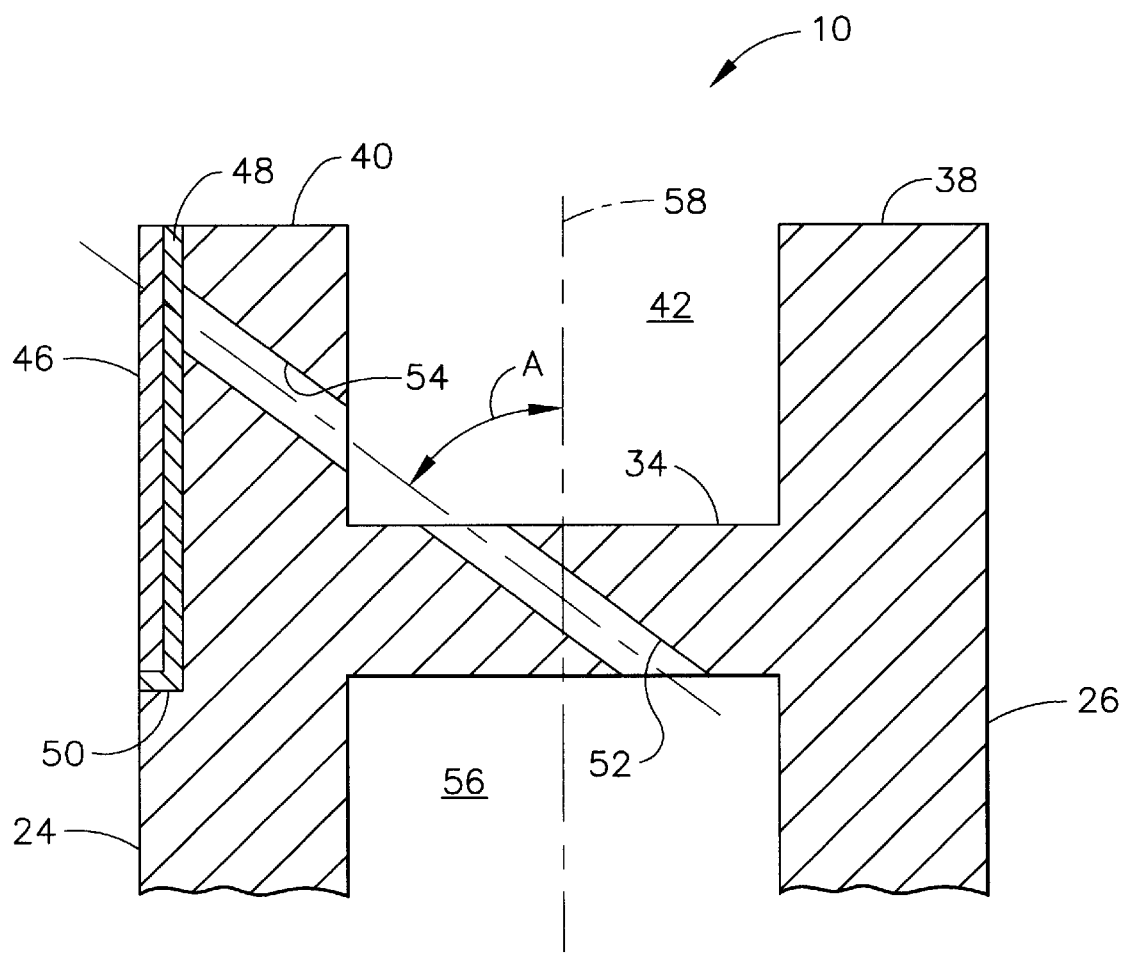
FIG. 2 is a cross-sectional view of the tip section of the turbine blade of FIG. 1.

Referring now to FIG. 2, the squealer tip 36 comprises a suction side tip wall 38 disposed in a spaced-apart relationship to a pressure side tip wall 40. The tip walls 40 and 38 are integral to the airfoil 18 and form extensions of the pressure and suction side walls 24 and 26, respectively. The outer surfaces of the pressure and suction side tip walls 40 and 38 respectively form continuous surfaces with the outer surfaces of the pressure and suction side walls 24 and 26. An open plenum 42 is defined between the pressure and suction side tip walls and above the tip cap 34. The tip 22 includes a plurality of coaxially aligned pairs of tip cap holes 52 and tip wall holes 54 extending through the tip cap 34 and pressure side tip wall 40, respectively. The holes 52 and 54 may be formed by any known process, for example laser drilling or electrical discharge machining (EDM). The pairs of holes 52 and 54 are spaced apart between the leading and trailing edges. The aligned pairs of holes 52 and 54 are disposed at a common acute inclination angle A, measured from a radial axis 58 of the airfoil 18. The tip cap hole 52 is disposed in flow communication with an internal cavity 56 for discharging cooling air toward the inner surface of the pressure side tip wall 40. By drilling through the pressure side tip wall 40 and the tip cap 34, the tip cap hole 52 may be formed at the necessary angle for impingement cooling of the pressure side wall 40. The number of hole pairs and their locations (both laterally with respect to the pressure and suction side tip walls and axially) may be modified in order to suit a particular application.

A notch 50 is formed in the outer surface of the pressure side tip wall 40, and may extend partially down into the pressure side wall 24 as well. The notch 50 receives a protective layer 46, which is made from a high temperature foil. By the use of the term "high temperature foil" it is meant a structure which is made from an alloy having improved strength and oxidation resistance over conventional superalloys at temperatures above 1093° C. (2000° F.), and capable of being formed to a thickness of about 0.51 mm (0.020 in.) or less. In the illustrated embodiment the protective layer 46 is about 0.12–0.254 mm (0.005–0.010 in.) in thickness. High temperature foils have an advantage over other similarly thin structures used in gas turbine applications in that they do not require large amounts of cooling air to achieve acceptable longevity. Suitable compositions of high temperature foils are described in more detail below. The protective layer 46 is attached to the pressure side tip wall 40. Depending on the type of high temperature foil used, an interface layer 48 may be disposed between the pressure side tip wall 40 and the protective layer 46.

Although the present invention has been described above with respect to an airfoil having a pair of aligned holes impinging upon the pressure side tip wall 40 of the airfoil 18 and a protective layer 46 attached to the pressure side tip wall 40, as that is usually the hottest portion of the airfoil tip 22, it will be understood that the invention could also be used to improve the durability of the suction side tip wall 38, by including one or more pairs of holes similar to holes 52 and 54, angled towards the suction side tip wall 38, and attaching a protective layer 46 to the outer surface of the suction side tip wall 38.

One suitable material that a high temperature foil may be formed from is a rhodium-based alloy comprising from about three atomic percent to about nine atomic percent of at least one precipitation-strengthening metal selected from the group consisting of zirconium, niobium, tantalum, titanium, hafnium, and mixtures thereof; up to about four atomic percent of at least one solution-strengthening metal selected from the group consisting of molybdenum, tungsten, rhenium, and mixtures thereof; from about one atomic percent to about five atomic percent ruthenium; up to about ten atomic percent platinum; up to about ten atomic percent palladium; and the balance rhodium; the alloy further comprising a face-centered-cubic phase and an $L1_2$—structured phase.

Another suitable material for the high temperature foil is a second rhodium-based alloy comprising rhodium, platinum, and palladium, wherein the alloy comprises a microstructure that is essentially free of $L1_2$—structured phase at a temperature greater than about 1000° C. (1832° F.). More particularly, the Pd is present in an amount ranging from about 1 atomic percent to about 41 atomic percent; the Pt is present in an amount that is dependent upon the amount of palladium, such that: a) for the amount of palladium ranging from about 1 atomic percent to about 14 atomic percent, the platinum is present up to about an amount defined by the formula (40+X) atomic percent, wherein X is the amount in atomic percent of the palladium; b) for the amount of palladium ranging from about 15 atomic percent up to about 41 atomic percent, the platinum is present in an amount up to about 54 atomic percent; and the balance comprises rhodium, wherein the rhodium is present in an amount of at least 24 atomic percent.

The high-temperature foil compositions described above exhibit about 1.2% thermal expansion from room temperature to about 1204° C. (2200° F.), whereas typical nickel-based superalloys used to form the airfoil 18 exhibit about 1.8% thermal expansion over the same temperature range. If the protective layer 46 were directly attached to the pressure side tip wall 40, the difference in thermal expansion between the Rh-based alloy and the superalloy would be large enough to cause concern due to stresses at the inter-mixed zone caused by differential thermal expansion. Therefore, it is desirable to incorporate an interface layer 48 between the protective layer 46 and the pressure side tip wall 40. The interface layer 48 has a thermal expansion intermediate to that of the high temperature foil and the superalloy, for example about 1.6% over the same temperature range.

In one possible embodiment, the interface layer 48 has a composition comprising from about 51 to about 61 atomic parts chromium, from about 18 to about 26 atomic parts palladium, and from about 18 to about 26 atomic parts nickel (but the nickel and palladium need not be present in equal amounts), and optionally has an addition of from about 5 to about 8 atomic parts aluminum. Minor amounts of other elements such as impurities may be present as well. The total of all of the elements is 100 atomic percent. Nickel forms the balance of the interface layer 48. Preferably, this interface layer 48 comprises about 56 atomic parts chromium, about 22 atomic parts nickel, and about 22 atomic parts palladium.

The interface layer 48 may be applied as a solid piece and bonded to the surface of the pressure side tip wall 40. The interface layer 48 may instead be supplied as a weld filler material and melted onto the surface of the pressure side tip wall 40. Welding may be accomplished by any operable approach. In either case, during application and/or service an interdiffusion of the adjacent portions of the pressure side tip wall 40 and the interface layer 48 may occur. This interdiffusion is desired, as it tends to raise the melting point of the interface layer 48 and improve the oxidation resistance of the interdiffused combination.

The protective layer 46 is applied overlying the interface layer 48. The protective layer 46 is preferably applied by welding or brazing. In one approach it is applied as a solid piece. The underlying interface layer 48, which has a lower melting point than either the airfoil 18 or the protective layer 46, is melted during the application process and then resolidified to cause bonding of the interface layer 48 to the pressure side tip wall 40 and to the protective layer 46. In another approach, the protective layer 46 is attached to the interface layer 48 by welding, for example by electron beam welding or laser welding. Any operable welding technique may be used.

Another suitable alloy for use as a high temperature foil is a solid-solution strengthened nickel-based alloy composition including about 10 to about 15 wt % Co; about 18 to about 22 wt % Cr; about 0.5 to about 1.3 wt % Al; about 3.5 to about 4.5 wt % Ta; about 1 to about 2 wt % Mo; about 13.5 to about 17.0 wt % W; up to about 0.08 wt % C; up to about 0.06 wt % Zr; up to about 0.015 wt % B; about 0.4 to about 1.2 wt % Mn; about 0.1 to about 0.3 wt % Si; and balance Ni. According to a particular composition, C is present in an amount not less than about 0.02 wt %, Zr is present in an amount not less than about 0.01 wt %, B is present in an amount not less than about 0.005 wt %. In a preferable form, the composition includes about 13.5 wt % Co; about 20 wt % Cr; about 0.8 wt % Al; about 4 wt % Ta; about 1.5 wt % Mo; about 15.5 wt % W; about 0.05 wt % C; about 0.03 wt % Zr; up to about 0.01 wt % B; about 0.7 wt % Mn; about 0.2 wt % Si; and balance Ni. The composition may contain typical impurities.

Another suitable nickel-based alloy for the high temperature foil is an alloy composition including about up to about 5.1 wt % Co; about 7.2 to about 9.5 wt % Cr; about 7.4 to about 8.4 wt % Al; about 4.3 to about 5.6 wt % Ta; about 0.1 to about 0.5 wt % Si; about 0.1 to about 0.5 wt % Hf; up to about 0.05 wt % C; up to about 0.05 wt % B; about 0 to about 2.2 Re; about 2.7 to about 4.4 wt % W; and balance Ni. Preferably, the composition contains about 3 to about 4.0 wt % Co; about 7.2 to about 8.5 wt % Cr; about 5.0 to 5.6 Ta; about 0.1 to 0.25 Hf, and about 1.0 to about 2.2 Re.

Yet another suitable nickel-based material for the high temperature foil is an alloy composition including about 2 to about 5 wt % Co; about 5 to about 15 wt % Cr; about 7 to about 10 wt % Al; about 4 to about 6 wt % Ta; about 0.5 to about 1.5 wt % Si; about 0.1 to about 0.5 wt % Hf; up to about 0.05 wt % C; up to about 0.05 wt % B; about 1.0 to about 2.0 Re; about 3 to about 4.5 wt % W; and balance Ni. Preferably, the composition contains about 3 to about 3.5 wt % Co; about 7 to about 9 wt % Al; up to about 0.03 wt % C; and up to about 0.03 wt % B.

A protective layer 46 formed from a nickel-based high temperature foil as described above does not require an interface layer 48, as its thermal expansion is similar to that of the Ni-based superalloy of the airfoil 18. The protective layer 46 is applied to the pressure side tip wall 40 as a solid piece, preferably by welding, for example by electron beam welding or laser welding. Any operable welding technique may be used.

In operation, cooling air is provided to the internal cavity 56 in a known manner from a source of cooling air. The cooling air passes through the tip cap holes 52 and impinges on the pressure side tip wall 40 and into the tip wall holes 54 inside the pressure side tip wall 40 and then returns to the plenum 42 for additional cooling. The interface layer 48 is cooled directly by the impingement cooling. Effective impingement cooling is therefore achieved in a cast-in tip cap blade. This improved cooling of the tip wall in combination with the protection of its outer surface by the protective layer comprising a high temperature foil will result in an airfoil having enhanced blade tip durability at elevated operating temperatures.

The foregoing has described a turbine airfoil having an integral tip cap and a pair of tip walls which extend radially outward past the tip cap to form a squealer tip. A coaxial pair of first and second holes extend through the tip cap and one of the tip walls respectively at an acute inclination angle, with the first hole being disposed so as to direct impingement cooling air on the tip wall having the second hole. A protective layer comprising a high temperature foil is disposed on the tip wall having the second hole therein. While specific embodiments of the present invention have been described, it will be apparent to those skilled in the art that various modifications thereto can be made without departing from the spirit and scope of the invention as defined in the appended claims.

What is claimed is:

1. An airfoil comprising:
    an airfoil body having a root, a tip, a leading edge, a trailing edge, a pressure side wall and a suction side wall, and an internal cavity, said internal cavity being bounded at its radially outer end by a tip cap which is integrally formed with said pressure and suction side walls;
    a squealer tip comprising spaced-apart tip walls extending above said tip cap;
    an aligned pair of first and second holes extending through said tip cap and one of said tip walls respectively at an acute inclination angle; and
    a protective layer disposed on an outer surface of said one of said tip walls, said protective layer comprising a high temperature foil.

2. The airfoil of claim 1 wherein said high temperature foil comprises a rhodium-based alloy.

3. The airfoil of claim 2 further comprising an interface layer disposed between said one of said tip walls and said protective layer.

4. The airfoil of claim 3 wherein said interface layer comprises chromium, palladium, and nickel.

5. The airfoil of claim 4 wherein said airfoil body comprises a nickel-base superalloy.

6. The airfoil of claim 1 wherein said high temperature foil comprises a nickel-based alloy.

7. The airfoil of claim 1 further comprising a notch formed in said one of said tip walls, wherein said protective layer is received in said notch.

8. An airfoil comprising:
    an airfoil body having a root, a tip, a leading edge, a trailing edge, a pressure side wall and a suction side wall, and an internal cavity, said internal cavity being bounded at its radially outer end by a tip cap which is integrally formed with said pressure and suction side walls;
    a suction side tip wall disposed at said tip and extending from said leading edge to said trailing edge;
    a pressure side tip wall disposed at said tip and extending from said leading edge to said trailing edge;
    an aligned pair of first and second holes extending through said tip cap and said pressure side tip wall respectively at an acute inclination angle, with said first hole being disposed in flow communication with said internal cavity for discharging therefrom a coolant toward an inner surface of said pressure side tip wall for cooling thereof; and
    a protective layer disposed on an outer surface of said pressure side tip wall, said protective layer comprising a high temperature foil.

9. The airfoil of claim 8 wherein said high temperature foil comprises a rhodium-based alloy.

10. The airfoil of claim 9 further comprising an interface layer disposed between said pressure side tip wall and said protective layer.

11. The airfoil of claim 10 wherein said interface layer comprises chromium, palladium, and nickel.

12. The airfoil of claim 11 wherein said airfoil body comprises a nickel-base superalloy.

13. The airfoil of claim 8 wherein said high temperature foil comprises a nickel-based alloy.

14. The airfoil of claim 8 further comprising a notch formed in said pressure side tip wall, wherein said protective layer is received in said notch.

* * * * *